United States Patent
Wang et al.

(10) Patent No.: US 12,098,629 B2
(45) Date of Patent: Sep. 24, 2024

(54) METHOD AND DEVICE FOR FAULT ESTIMATION OF MEASUREMENT AND CONTROL DEVICE FOR ROTARY STEERABLE DRILLING SYSTEM

(71) Applicant: CHINA UNIVERSITY OF PETROLEUM, Qingdao (CN)

(72) Inventors: Weiliang Wang, QingDao (CN); Yanfeng Geng, QingDao (CN); Mingzhu Shao, QingDao (CN); Huijie Xu, QingDao (CN); Mengyu Tu, QingDao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 18/402,831

(22) Filed: Jan. 3, 2024

(65) Prior Publication Data
US 2024/0133285 A1  Apr. 25, 2024
US 2024/0229635 A9  Jul. 11, 2024

(30) Foreign Application Priority Data

Jun. 28, 2023 (CN) .......................... 202310775933.7

(51) Int. Cl.
*E21B 44/00* (2006.01)
*E21B 4/04* (2006.01)
*E21B 7/06* (2006.01)
*E21B 47/024* (2006.01)
*G01D 21/02* (2006.01)

(52) U.S. Cl.
CPC .............. *E21B 44/005* (2013.01); *E21B 4/04* (2013.01); *E21B 7/068* (2013.01); *E21B 47/024* (2013.01); *G01D 21/02* (2013.01); *E21B 2200/20* (2020.05)

(58) Field of Classification Search
CPC .............................. E21B 47/024; G01D 21/02
See application file for complete search history.

(56) References Cited

U.S. PATENT DOCUMENTS

| | | | |
|---|---|---|---|
| 2021/0199838 A1* | 7/2021 | Tang ......................... | G01V 3/32 |
| 2021/0348504 A1* | 11/2021 | Xue ......................... | E21B 47/14 |
| 2023/0151696 A1* | 5/2023 | Weideman .............. | E21B 7/046 |
| | | | 175/27 |

* cited by examiner

*Primary Examiner* — Bijan Mapar
(74) *Attorney, Agent, or Firm* — IPRO, PLLC

(57) ABSTRACT

Provided are a method and device for fault estimation of a measurement and control device for a rotary steerable drilling system. The method for fault estimation includes: S1, establishing a state model of the measurement and control device for the rotary steerable drilling system; S2, establishing a fault-free model filter and a fault model filter, and initializing the fault-free model filter and the fault model filter; S3, detecting whether the measurement and control device for the rotary steerable drilling system has a fault; and S4, reinitializing the fault model filter under the condition that a detection result is fault-free; reinitializing the fault-free model filter under the condition that the detection result is faulty; and estimating, by the fault model filter, the fault in real time, and obtaining, by the fault model filter, the estimation value $\hat{x}_{wf}$.

1 Claim, 8 Drawing Sheets

METHOD AND DEVICE FOR FAULT ESTIMATION OF MEASUREMENT AND CONTROL DEVICE FOR ROTARY STEERABLE DRILLING SYSTEM

TECHNICAL FIELD

The present disclosure belongs to the technical field of drilling apparatuses, and particularly relates to a method and device for fault estimation of a measurement and control device for a rotary steerable drilling system.

BACKGROUND

A rotary steerable drilling system controls a drilling direction of a drill bit in a case that a drill string continuously rotates, which has been a significant change in a directional drilling technology since the 1990s.

In order to achieve high-precision steering drilling, a control device for the rotary steerable drilling system requires various types of sensors to measure and feed back working parameters of a drilling tool. However, a harsh environment having a downhole high temperature, high pressure and strong vibration easily causes sensor damage, thereby affecting construction efficiency of drilling. At present, methods for processing downhole faults of sensors mostly use hardware redundancy and screening of component performance, thereby ensuring reliability of an electronic circuit system for the drilling tool by means of quantity redundancy or performance redundancy of the components. However, a redundancy mode increases cost of the control device for the rotary steerable drilling system. Moreover, with constant increase in the number of the components and improvement in reliability requirements, a method for redundant layout is no longer able to satisfy reliability requirements of the current system. Furthermore, a measurement and control system for a drilling tool performs downhole data communication by means of a bus. With a bandwidth limitation and a signal conversion precision limitation of the communication bus, a quantization error of sensor data is inevitable. It is necessary to fully consider an influence of the error on fault diagnosis performance. A current means for processing a fault of a sensor is still in a stage of hardware redundancy and shutdown maintenance. In view of this, it is urgent to construct a more effective method for processing a fault of a downhole sensor, so as to satisfy reliability requirements of a modern high-performance drilling system.

SUMMARY

Aiming at the defects of the prior art, the present disclosure provides a method and device for fault estimation of a measurement and control device for a rotary steerable drilling system. The technical solution can accurately determine a fault of a sensor under the condition of single and concurrent sensor faults, and compute a sensor fault value and an unknown input value according to a sensor measurement value, a system control input value and an established system model.

A method for fault estimation of a measurement and control device for a rotary steerable drilling system includes:

S1, establishing a state model of the measurement and control device for the rotary steerable drilling system:

$$x = [i_q \ \omega_n \ \omega_g \ \varphi]^T$$

$$\begin{cases} x(k+1) = Ax(k) + Bu(k) + D_d d(k) + \omega(k) \\ y(k) = Cx(k) + Ff(k) + v(k) + q(k) \end{cases}$$

where x is an original state quantity of the measurement and control device for the rotary steerable drilling system, $i_q$ is a q-shaft current of an electric motor of a stable platform, $\omega_n$ is a rotating speed of a driving motor of the stable platform, $\omega_g$ is a rotating speed of a gyroscope, $\varphi$ is a tool face angle, x(k) is an estimation value at a moment k, x(k+1) is a state estimation value at a moment k+1, u(k) is an output control quantity of a controller, $d(k)=[d_1(k) \ d_2(k)]^T=[T_L(k) \ \omega_h(k)]^T$ is an unknown input quantity, $T_L(k)$ is load torque at a moment k, $\omega_h(k)$ is a rotating speed of a drill collar at the moment k, y(k) is a measurement output value of the measurement and control device at the moment k, $f(k)=[f_{i_q} \ f_{\omega_g} \ f_\varphi]^T$ is a sensor measurement fault, $f_{i_q}$ is a current measurement fault, $f_{\omega_g}$ is a gyroscope measurement fault, and $f_\varphi$ is a tool face angle measurement fault; and $\omega(k)$ is process noise at the moment k, v(k) is sensor measurement noise at the moment k, q(k) is a quantization error at the moment k, A, B and C are a system matrix, a control matrix and an output matrix respectively, and $D_d$ and F are distribution matrices of the unknown input quantity and the sensor measurement fault respectively;

S2, establishing a fault-free model filter and a fault model filter on the basis of the state model of the measurement and control device for the rotary steerable drilling system, and initializing the fault-free model filter and the fault model filter;

S3, selecting a method for detecting a fault according to noise characteristics to detect whether the measurement and control device for the rotary steerable drilling system has the fault; and S4, reinitializing the fault model filter by using a state estimation value $\hat{x}_{wof}$ of the fault-free model filter and a state error covariance matrix $P_{wof}$ of the fault-free model filter under the condition that a detection result is fault-free; reinitializing the fault-free model filter by using a state estimation value $\hat{x}_{wf}$ of the fault model filter and a state error covariance matrix $P_{wf}$ of the fault model filter under the condition that the detection result is faulty; and estimating, by the fault model filter, the fault in real time, and obtaining, by the fault model filter, the state estimation value $\hat{x}_{wf}$ of the fault model filter.

Further, a pseudo-measurement formula is established by constructing virtual measurement values having mean variances equal to 0 by using a constraint relation between the rotating speed $\omega_n$ of the driving motor of the stable platform, the rotating speed $\omega_g$ of the gyroscope and the rotating speed $\omega_h(k)$ of the drill collar:

$$y_5 = 0 = \beta\omega_n - \omega_g + \omega_h$$

where $y_5$ is a set pseudo-measurement sensor value, and $\beta$ is a constant.

Further, the method for detecting a fault in S3 is determined as follows under the condition that a probability distribution of noise of the system is known: computing conditional probabilities $p'_{wof}$ and $p'_{wf}$ of the fault-free model filter and the fault model filter respectively, and considering that the system has no fault under the condition of $p'_{wof} > p'_{wf}$; and considering that the system has a fault under the condition of $p'_{wof} \leq p'_{wf}$.

Further, the fault-free model filter is formed by augmenting unknown inputs $d_1$ and $d_2$ as a state of the system on the basis of the model of the measurement and control device for the rotary steerable drilling system, $d_1$ is load torque $T_L$, and $d_2$ is a rotating speed $\omega_h$ of a drill collar; a model state of the fault-free model filter is as follows:

$$x_{wof} = [i_q\ \omega_n\ \omega_g\ \varphi\ T_L\ \omega_h]^T$$

$$\begin{cases} \overline{x}_{wof}(k+1) = \overline{A}_{wof}\overline{x}_{wof}(k) + \overline{B}_{wof}u(k) + \overline{\omega}_{wof}(k) \\ \overline{y}(k) = \overline{C}_{wof}\overline{x}_{wof}(k) + \overline{v}(k) + \overline{q}(k) \end{cases}$$

where $\overline{A}_{wof} = \begin{bmatrix} A & D_d \\ 0 & I_2 \end{bmatrix}, \overline{B}_{wof} = \begin{bmatrix} B \\ 0_{2\times 1} \end{bmatrix}, \overline{C}_{wof} = [C_1\ C_2]$, $$C_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 1 \\ 0 & \beta & -1 & 0 \end{bmatrix}, C_2 = \begin{bmatrix} 0 & 0 \\ 0 & 0 \\ 0 & 0 \\ 0 & 0 \\ 0 & 0 \\ 0 & 1 \end{bmatrix}, \overline{\omega}_{wof}(k) = \begin{bmatrix} \omega(k) \\ \omega_d(k) \end{bmatrix}, \overline{y}(k) = \begin{bmatrix} y(k) \\ y_5(k) \end{bmatrix},$$

$\overline{v}(k)$ is sensor measurement noise at the moment k after a pseudo-measurement sensor value $y_5(k)$ is added into the system, $\overline{q}(k)$ is a sensor quantization error at the moment k after the pseudo-measurement sensor value $y_5(k)$ is added into the system, and wof indicates no fault;

the fault model filter is formed by adding the current measurement fault $f_{i_q}$, the gyroscope measurement fault $f_{\omega_g}$ and the tool face angle measurement fault $f_\varphi$ on the basis of the fault-free model filter; and a state of the fault model filter is as follows:

$$x_{wf} = [i_q\ \omega_n\ \omega_g\ \varphi\ T_L\ \omega_h\ f_{i_q}\ f_{\omega_g}\ f_\varphi]^T$$

$$\begin{cases} \overline{x}_{wf}(k+1) = \overline{A}_{wf}\overline{x}_{wf}(k) + \overline{B}_{wf}u(k) + \overline{\omega}_{wf}(k) \\ \overline{y}_k = \overline{C}_{wf}\overline{x}_{wf}(k) + \overline{v}(k) + \overline{q}(k) \end{cases}$$

where $\overline{A}_{wf} = \begin{bmatrix} \overline{A}_{wof} & 0 \\ 0 & I \end{bmatrix}, \overline{B}_{wf} = \begin{bmatrix} \overline{B}_{wof} \\ 0_{3\times 1} \end{bmatrix}$, $$\overline{C}_{wf} = [\overline{C}_{wof}\ F], F = \begin{bmatrix} F \\ 0 \end{bmatrix}, \overline{\omega}_{wf} = \begin{bmatrix} \overline{\omega}_{wof}(k) \\ \omega_f(k) \end{bmatrix},$$

and wf indicates a fault.

Further, under the condition that the probability distribution of the noise of the system is known, assuming that the conditional probability of the fault-free model filter and the fault model filter is $p'_i(k)$, and $a_1$ and $a_2$ correspond to a fault-free model filter model and a fault model filter model respectively:

$$p'_i(k) = Pr[a = a_i | Y(k) = Y_k], i = 1, 2$$

a conditional probability iterative update formula of the two filters is as follows:

$$p'_i(k) = \frac{f_{y(k)|a,Y_{k-1}}(\overline{y}(k)\ |\ a_i, Y_{k-1})p'_i(k-1)}{\sum_{j=1}^{2} f_{y(k)|a,Y_{k-1}}(\overline{y}(k)\ |\ a_i, Y_{k-1})p'_i(k-1)},$$

$i = 1, 2$ where $Y_{k-1} = \{y(1), y(2), \cdots, y(k-1)\}$ is historical sensor measurement data, and a probability density function of the model in step k is as follows:

$$f_{y(k)|a,Y_{k-1}}(\overline{y}(k)\ |\ a_i, Y_{k-1}) = \frac{\exp\{-\gamma_i^T(k)M_i^{-1}(k)\gamma_i(k)/2\}}{(2\pi)^{m/2}|M_i(k)|^{1/2}}$$

where m is the number of measurement outputs, |·| indicates a determinant of the matrix, $M_i(k)$ indicates an innovation covariance matrix of step k, and $\gamma_i(k)$ indicates innovation of step k.

Further, the fault-free model filter and the fault model filter are Kalman filters, and in S4, when the fault model filter is reinitialized by using the state estimation value $\hat{x}_{wof}$ and the state error covariance matrix $P_{wof}$ of the fault-free model filter, due to different state dimensions of the two filters, initial values need to be given for state assignments of the current measurement fault $f_{i_q}$, the gyroscope measurement fault $f_{\omega_g}$, and the tool face angle measurement fault $f_\varphi$, i.e.

$$\hat{x}_{wf,j} = x_f^0, j = n+1, \ldots, n+3$$

$$P_{wf,jj} = P_f^0, j = n+1, \ldots, n+3$$

where n=6, and $\hat{x}_{wf,j}$ indicates a j-th element of $\hat{x}_{wf}$, and $P_{wf,jj}$ indicates an element of a j-th row and a j-th column of the matrix $P_{wf}$.

Further, the unknown input d(k) of the fault-free model filter and the sensor measurement fault f(k) of the fault model filter are random walk processes, i.e.

$$d(k+1) = d(k) + \omega_d(k)$$

$$f(k+1) = f(k) + \omega_f(k)$$

where $\omega_d(k)$ are $\omega_f(k)$ process noise variables having variances of $E\{\omega_d(k)(\omega_d(l))^T\} = Q_d(k)\delta_{kl}$ and $E\{\omega_f(k)(\omega_f(l))^T\} = Q_f(k)\delta_{kl}$ respectively, $Q_d(k)$ and $Q_f(k)$ are process noise covariance matrices of the unknown input d(k) and the sensor measurement fault f(k), the unknown input d(k) includes load torque $T_L$ and a rotating speed $\omega_h$ of a drill collar, and the sensor measurement fault f(k) includes the current measurement fault $f_{i_q}$, the gyroscope measurement fault $f_{\omega_g}$ and the tool face angle measurement fault $f_\varphi$.

Further, $Q_d(k)$ is computed by using an adaptive method, which is specifically as follows:

$$\overline{\omega}_{wof}(k) = \begin{bmatrix} \omega(k) + \omega^d(k) \\ \omega_d(k) \end{bmatrix} = \begin{bmatrix} \omega(k) + D_d\omega_d(k) \\ \omega_d(k) \end{bmatrix}$$

where $\omega^d(k)$ is configured to compensate for an influence of a non-optimal value $Q_d(k)$ on state estimation, and the influence of the non-optimal value is approximated by using $D_d\omega_d(k)$; and a theoretical innovation covariance is as follows:

$$\check{M}_{wf} = C_1QC_1^T + (C_1D_d + C_2)Q_d(C_2D_d + C_2)^T + \overline{F}Q_f\overline{F}^T + R$$

an actual innovation covariance is as follows:

$$\hat{M}_{wf} = \frac{1}{N}\sum_{j=k-N+1}^{k} \gamma_{wf}(j)\gamma_{wf}^T(j)$$

$$\check{M} = \hat{M}$$

$$Q_d(k) = (C_1D_d + C_2)^{-1}(\hat{M}_{wf} - C_1QC_1^T - \overline{F}Q_f\overline{F}^T - R)((C_1D_d + C_2)^T)^{-1}$$

where noise matrices Q and R are constants, N is a sliding time window, and $Q_f$ is 0 since the system estimates a constant deviation fault.

Further, under the condition that the probability distribution of the noise of the system is unknown but bounded, the method for detecting a fault in S3 detects the fault of the system by using the following set-membership fault detection filter:

$$p_r(k+1)=CRp_e(k)-C(L_1F+NF)f(k)+Ff(k+1)-CNF\Delta f(k+1)$$

$$H_r(k+1)=[CR_\downarrow H_e(k)C(L_1F+NF)v(k)CNH_{\Delta v}H_vC(L_1F+NF)q(k)CNH_{\Delta q}H_q]$$

where e and r indicate an error and a residual respectively; p and H indicate a center and a generation matrix of a set respectively; R and N are filter matrices to be designed separately; filter matrix parameters are accurately computed by minimizing $H_\infty$, $H_-/H_\infty$ and P-radius; and it is determined that the system has no fault under the condition that all residual sets include zero points, and it is determined that the system has a fault under the condition that any residual set does not include a zero point:

$$\begin{cases} 0 \in [\underline{s_i}(k)\ \overline{s_i}(k)] & \forall i \in \{1,2,3,4\} \text{ No fault,} \\ 0 \notin [\underline{s_i}(k)\ \overline{s_i}(k)] & \exists i \in \{1,2,3,4\} \text{ Fault,} \end{cases}$$

where $\underline{s_i}(k) = p_{r,i}(k) - \|H_{r,i}(k)\|_1$, $\overline{s_i}(k) = p_{r,i}(k) + \|H_{r,i}(k)\|_1$, and $p_{r,i}(k)$ and $H_{r,i}(k)$ indicate a i-th element of a center vector of a residual and a i-th row of a residual generation matrix at the moment k respectively; and $\underline{s_i}$ and $\overline{s_i}$ indicate a lower boundary and an upper boundary of the set respectively.

The present disclosure further provides a device for fault estimation of a measurement and control device for a rotary steerable drilling system. The measurement and control device for the rotary steerable drilling system includes a stable platform, an electric motor connected to the stable platform, a sensor unit, a motor driving board connected to the electric motor, and a motor voltage controller, where the sensor unit includes a motor rotating speed sensor mounted on the electric motor, a motor current sensor mounted on the motor driving board, a gyroscope mounted on the stable platform, and a tool face angle measurement unit; and the device for fault estimation includes a data interaction unit, a fault detector, a fault-free model filter, a fault model filter and a state initializer, where the data interaction unit is configured to obtain sensor data and motor voltage controller data, is connected to the fault detector, the fault-free model filter and the fault model filter, and transmits obtained data to the fault detector, the fault-free model filter and the fault model filter for processing;

the fault-free model filter computes a state estimation value $\hat{x}_{wof}$ of the fault-free model filter and a state error covariance matrix $P_{wof}$ of the fault-free model filter; the fault model filter computes a state estimation value $\hat{x}_{wf}$ of the fault model filter and a state error covariance matrix $P_{wf}$ of the fault model filter;

the fault detector is connected to the state initializer, determines a fault condition of the system according to the data obtained by the data interaction unit 6, and sends the fault condition to the state initializer; and the state initializer is connected to the fault-free model filter and the fault model filter, and initializes the fault-free model filter and the fault model filter according to a fault result.

According to the method and device of the present disclosure, the state model of the measurement and control device for the rotary steerable drilling system is established, such that fault types existing in the measurement and control device for the rotary steer drilling system, and downhole limited data transmission bandwidth and interference are comprehensively considered; the fault-free model filter and the fault model filter are established on the basis of the state model of the measurement and control device for the rotary steerable drilling system, and the fault-free model filter and the fault model filter are initialized; whether the measurement and control device for the rotary steerable drilling system has a fault is detected; the fault model filter is reinitialized by using the state estimation value $\hat{x}_{wof}$ of the fault-free model filter and the state error covariance matrix $P_{wof}$ of the fault-free model filter under the condition that the detection result is fault-free; the fault-free model filter is reinitialize by using the state estimation value $\hat{x}_{wf}$ of the fault model filter and the state error covariance matrix $P_{wf}$ of the fault model filter under the condition that the detection result is faulty; and the fault filter estimates the fault in real time and obtains the estimation value.

An initialization algorithm is selected to alternately update initial state values and initial covariance matrix values of the two filters, thereby ensuring real-time accuracy of filter estimation. A fault amplitude and a disappearance moment of fault occurrence can be accurately estimated for both a constant deviation and an intermittent fault of multiple sensors, and a drilling tool does not need to be taken out from a wellbore, thereby prolonging working time of the downhole drilling tool, and reducing drilling cost.

Figure 1:
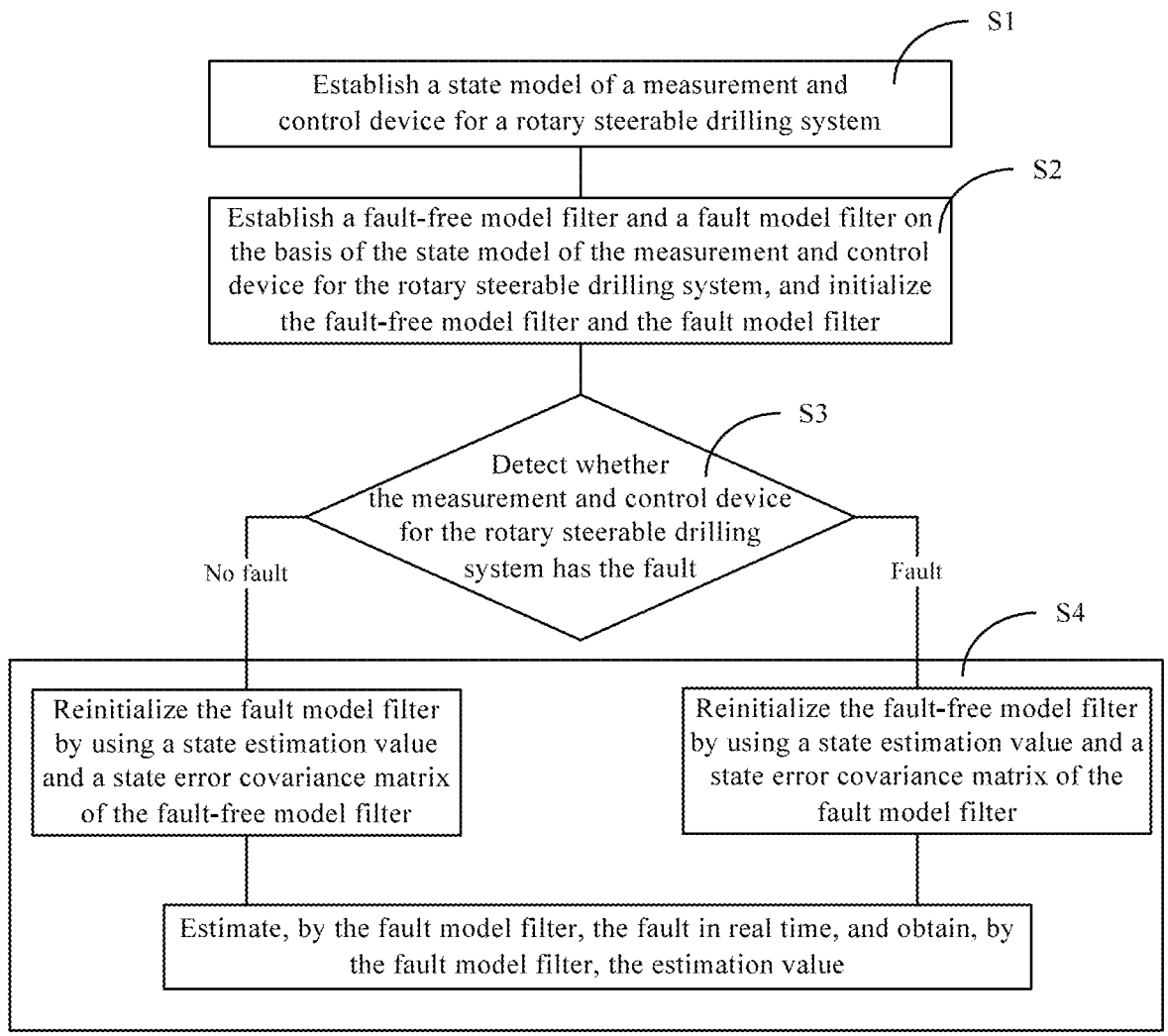
FIG. 1 is a flow chart of a method for fault estimation of a measurement and control device for a rotary steerable drilling system according to the present disclosure.

In the figures, 1—motor current sensor, 2—motor rotating speed sensor, 3—gyroscope, 4—tool face angle measurement unit, 5—motor voltage controller, 6—data interaction unit, 7—fault detector, 8—state initializer, 9—fault-free model filter, and 10—fault model filter.

DETAILED DESCRIPTION OF THE EMBODIMENTS

In order to make the objectives, technical solutions and advantages of the present disclosure more clear, the technical solutions of the present disclosure will be clearly and completely described below in combination with the specific examples and the corresponding accompanying drawings of the present disclosure. Apparently, the examples described are merely some examples rather than all examples of the present disclosure. All other examples obtained by those of ordinary skill in the art on the basis of the examples of the present disclosure without making creative efforts fall within the scope of protection of the present disclosure.

The technical solutions disclosed in various examples of the present disclosure are described in detail below in combination with the accompanying drawings.

The differences between the examples are emphatically described in the above examples of the present disclosure, and as long as there is no contradiction between different optimization features of the examples, the examples can be combined to form preferred examples, which is not repeated herein in consideration of brevity.

The examples of the present disclosure are described above in combination with the accompanying drawings, but the present disclosure is not limited to the above specific embodiments. The above specific embodiments are only illustrative and not restrictive. With the motivation of the present disclosure, those of ordinary skill in the art can further make many forms that fall within the scope of protection of the present disclosure without departing from the purpose and claims of the present disclosure.

A measurement and control device for a rotary steerable drilling system includes a stable platform, an electric motor connected to the stable platform, a sensor unit, a motor driving board connected to the electric motor, and a motor voltage controller 5, where the sensor unit includes a motor rotating speed sensor 2 mounted on the electric motor, a motor current sensor 1 mounted on the motor driving board, a gyroscope 3 mounted on the stable platform, and a tool face angle measurement unit 4.

With increase in the number of sensors and electronic components of the measurement and control device for the rotary steerable drilling system, a redundant fault processing method cannot satisfy field engineering requirements of drilling, and therefore a method for fault estimation of a measurement and control device for a rotary steerable drilling system is provided. As shown in FIG. 1, the method for fault estimation includes:

S1, establish a state model of the measurement and control device for the rotary steerable drilling system:

$$x = [i_q \ \omega_n \ \omega_g \ \varphi]^T$$

$$\begin{cases} x(k+1) = Ax(k) + Bu(k) + D_d d(k) + \omega(k) \\ y(k) = Cx(k) + Ff(k) + v(k) + q(k) \end{cases}$$

where x is an original state quantity of the measurement and control device for the rotary steerable drilling system, $i_q$ is a q-shaft current of an electric motor of a stable platform, $\omega_n$ is a rotating speed of a driving motor of the stable platform, $\omega_g$ is a rotating speed of a gyroscope, $\varphi$ is an angle of a tool face angle, x(k) is a state estimation value at a moment k, x(k+1) is a state estimation value at a moment k+1, u(k) is an output control quantity of a controller, $d(k)=[d_1(k) \ d_2(k)]^T = [T_L(k) \ \omega_h(k)]^T$ is an unknown input quantity, $T_L(k)$ is load torque at a moment k, $\omega_h(k)$ is a rotating speed of a drill collar at the moment k, $\omega(k)$ is process noise at the moment k, y(k) is a measurement output value of the measurement and control device at the moment k, $f(k) = [f_{i_q} \ f_{\omega_g} \ f_\varphi]^T$ is a sensor measurement fault, $f_{i_q}$ is a current measurement fault, $f_{\omega_g}$ is a gyroscope measurement fault, and $f_\varphi$ is a tool face angle measurement fault; and $\omega(k)$ is process noise at the moment k, v(k) is sensor measurement noise at the moment k, q(k) is a quantization error at the moment k, A, B and C are a system matrix, a control matrix and an output matrix respectively, and $D_d$ and F are distribution matrices of the unknown input quantity and the sensor measurement fault respectively;

S2, establish a fault-free model filter and a fault model filter by augmenting the unknown input and the fault as auxiliary states on the basis of the state model of the measurement and control device for the rotary steerable drilling system, and initialize the fault-free model filter and the fault model filter;

S3, select a method for detecting a fault according to noise characteristics to detect whether the measurement and control device for the rotary steerable drilling system has the fault; and S4, reinitialize the fault model filter by using a state estimation value $\hat{x}_{wof}$ of the fault-free model filter and a state error covariance matrix $P_{wof}$ of the fault-free model filter under the condition that a detection result is fault-free; reinitialize the fault-free model filter by using a state estimation value $\hat{x}_{wf}$ of the fault model filter and a state error covariance matrix $P_{wf}$ of the fault model filter under the condition that the detection result is faulty; and estimate, by the fault model filter, the fault in real time, and obtain, by the fault model filter, the state estimation value $\hat{x}_{wf}$ of the fault model filter.

In the prior art, a common model of the measurement and control device for the rotary steerable drilling system is as follows:

$$x = [i_q \ \omega_n \ \omega_g \ \varphi]^T$$

$$\begin{cases} x(k+1) = Ax(k) + Bu(k) + \omega(k) \\ y(k) = Cx(k) + v(k) \end{cases}$$

where x is an original state quantity of the measurement and control device for the rotary steerable drilling system, $i_q$ is a q-shaft current of an electric motor of a stable platform, $\omega_n$ is a rotating speed of a driving motor of the stable platform, $\omega_g$ is a rotating speed of a gyroscope, $\varphi$ is an angle of a tool face angle, x(k) is an estimation value at a moment k, x(k+1) is a state estimation value at a moment k+1, u(k) is an output control quantity of a controller, $\omega(k)$ is process noise at the moment k, y(k) is a measurement output value of the measurement and control device at the moment k, and v(k) is measurement noise at the moment k.

Synthetically, firstly, steering torque $T_L$ directly acts on the stable platform by means of a bit connecting shaft, and a change of the steering torque affects the load torque of the driving motor of the stable platform, thereby affecting a motor output current; secondly, the stable platform works in a dynamic balance state, when the rotating speed $\omega_n$ of the driving motor of the stable platform and the rotating speed $\omega_h$ of the drill collar are the same in reverse directions, the stable platform is stationary to the ground, and if the rotating speed of the drill collar fluctuates, the electric motor of the stable platform must also make a rapid response to stabilize a tool face angle; thirdly, with a change of system components along with a working condition or the influence by parameter identification precision, it is impossible to achieve complete accurate modeling, and there is process noise ω(k) during system modeling; fourthly, vibration of a downhole drilling tool inevitably generates sensor measurement noise v(k); fifthly, with the limitation of a downhole data transmission bandwidth and signal conversion precision, a sensor data quantization error q(k) is inevitably generated; and sixthly, the sensor measurement fault f(k) is caused by high temperature and high pressure, environmental humidity and vibration impact. Therefore, a system complete model of the measurement and control device for the rotary steerable drilling system is established as follows:

$$\begin{cases} x(k+1) = Ax(k) + Bu(k) + D_d d(k) + \omega(k) \\ y(k) = Cx(k) + Ff(k) + v(k) + q(k) \end{cases}$$

Where $d(k) = [d_1(k)\ d_2(k)]^T = [T_L(k)\ \omega_h(k)]^T$ is an unknown input quantity, ω(k) is process noise at the moment k, y(k) is a measurement output value of the measurement and control device at the moment k, $f(k)=[f_{i_q}\ f_{\omega_g}\ f_{\varphi}]^T$ is a sensor measurement fault, $f_{i_q}$ is a current measurement fault, $f_{\omega_g}$ is a gyroscope measurement fault, $f_{\varphi}$ is a tool face angle measurement fault, ω(k) is process noise at the moment k, v(k) is sensor measurement noise at the moment, q(k) is a quantization error at the moment k, A, B and C are a system matrix, a control matrix and an output matrix respectively, and $D_d$ and F are distribution matrices of the unknown input quantity and the sensor measurement fault respectively.

On the basis that the complete model of the rotary steerable drilling system is established, the fault condition of the measurement and control device for the rotary steerable drilling system is determined, and the fault-free model filter and the fault model filter are cross-initialized according to whether the system has a fault, such that the state, the unknown input and the fault of the measurement and control device for the rotary steerable drilling system can be accurately estimated no matter whether the system has the fault. Under a hardware structure of an existing drilling tool measurement and control system, permanent fault and intermittent fault estimation of multiple sensors can be achieved without replacing sensors or arranging multiple redundant sensors, and continuous operation of the drilling tool measurement and control system is ensured, thereby prolonging downhole fault-free working time of the drilling tool.

After the fault-free model filter or the fault model filter is initialized according to the detected system fault condition, S3 and S4 can be repeatedly executed.

In the example, by using the constraint relation determined between the rotating speed $\omega_n$ of the driving motor of the stable platform, the rotating speed $\omega_g$ of the gyroscope, and the rotating speed $\omega_h(k)$ of the drill collar, state estimation accuracy is improved by constructing virtual measurement values having mean variances equal to 0, and a pseudo-measurement formula can be established:

$$y_5=0=\beta\omega_n-\omega_g+\omega_h$$

where $y_5$ is manually set pseudo-measurement sensor value, and β is a constant, which is specifically the product of a unit conversion factor and a reducer reduction ratio.

In practical engineering applications, some prior constraints can affect the precision of state estimation. If constraint information can be effectively utilized, the relation between state variables can be further clarified, thereby reducing the uncertainty of the model of the system. On the premise that the control system stably has an effect of control, the system state variables, $\omega_n$, $\omega_g$ and $\omega_h$ have certain mathematical relations. A virtual measurement value having mean variance equal to 0 is constructed to determine the constraint, so as to improve estimation accuracy. Specifically, a pseudo-measurement formula may be established in an output equation:

$$y_5=0=\beta\omega_n-\omega_g+\omega_h$$

where $y_5$ is a set pseudo-measurement sensor value.

Figure 2:
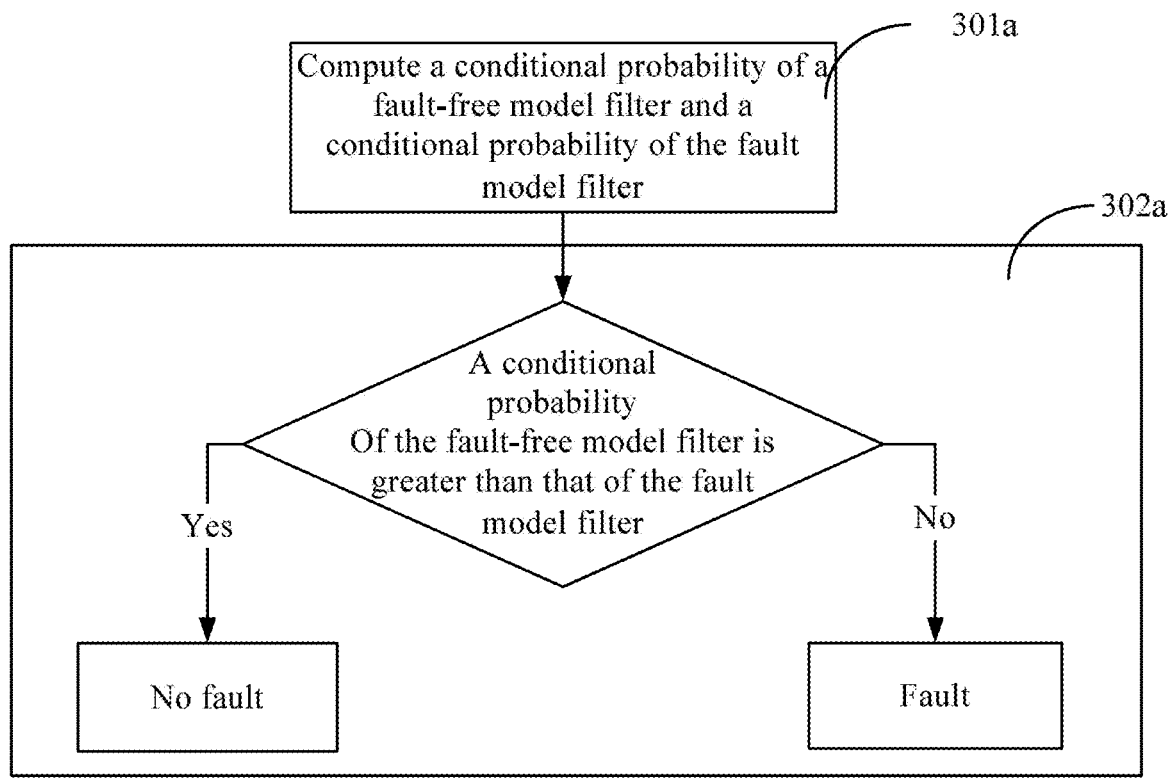
FIG. 2 is a flow chart of a method for fault estimation of a measurement and control device for a rotary steerable drilling system according to the present disclosure.

FIG. 2 is a flow chart of a method for detecting a fault in the example. Under the condition that a probability distribution of noise of a system is known, the method for detecting a fault includes:

S301a, compute conditional probabilities $p'_{wof}$ and $p'_{wf}$ of the fault-free model filter and the fault filter; and S302a, consider that the system has no fault under the condition of $p'_{wof} > p'_{wf}$; and consider that the system has a fault under the condition of $p'_{wof} \leq p'_{wf}$.

Specifically, load torque $T_L$ and a rotating speed $\omega_h$ of a drill collar may be introduced in a drilling process. Therefore, the fault-free model filter is formed by augmenting unknown inputs $d_1$ and $d_2$ as a state of the system on the basis of the model of the measurement and control device for rotary steerable drilling system, $d_1$ is load torque $T_L$, and $d_2$ is a rotating speed $\omega_h$ of a drill collar; and moreover, a pseudo-measurement output is increased in a measurement equation in combination with a constraint relation between states, and therefore a model state of the fault-free model filter is as follows:

$$x_{wof} = [i_q\ \omega_n\ \omega_g\ \varphi\ T_L\ \omega_h]^T$$

$$\begin{cases} \overline{x}_{wof}(k+1) = \overline{A}_{wof}\overline{x}_{wof}(k) + \overline{B}_{wof}u(k) + \overline{\omega}_{wof}(k) \\ \overline{y}_k = \overline{C}_{wof}\overline{x}_{wof}(k) + \overline{v}(k) + \overline{q}(k) \end{cases}$$

where $\overline{A}_{wof} = \begin{bmatrix} A & D_d \\ 0 & I_2 \end{bmatrix}, \overline{B}_{wof} = \begin{bmatrix} B \\ 0_{2\times 1} \end{bmatrix}, \overline{C}_{wof} = [C_1\ C_2],$ $C_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & \beta & -1 & 0 \end{bmatrix}, C_2 = \begin{bmatrix} 0 & 0 \\ 0 & 0 \\ 0 & 0 \\ 0 & 0 \\ 0 & 1 \end{bmatrix}, \overline{\omega}_{wof}(k) = \begin{bmatrix} \omega(k) \\ \omega_d(k) \end{bmatrix}, \overline{y}(k) = \begin{bmatrix} y(k) \\ y_5(k) \end{bmatrix},$ $\overline{v}(k)$ is sensor measurement noise at the moment k after a pseudo-measurement sensor value $y_5(k)$ is added into the system, $\overline{q}(k)$ is a sensor quantization error at the moment k after the pseudo-measurement sensor value $y_5(k)$ is added into the system, and wof indicates no fault.

The fault model filter is formed by adding the current measurement fault $f_{i_q}$, the gyroscope measurement fault $f_{\omega_g}$ and the tool face angle measurement fault $f_{\varphi}$ as new model state quantities on the basis of the fault-free model filter; and a state of the fault model filter is as follows:

$$x_{wf} = [i_q\ \omega_n\ \omega_g\ \varphi\ T_L\ \omega_h\ f_{i_q}\ f_{\omega_g}\ f_{\varphi}]^T$$

$$\begin{cases} \overline{x}_{wf}(k+1) = \overline{A}_{wf}\overline{x}_{wf}(k) + \overline{B}_{wf}u(k) + \overline{\omega}_{wf}(k) \\ \overline{y}_k = \overline{C}_{wf}\overline{x}_{wf}(k) + \overline{v}(k) + \overline{q}(k) \end{cases}$$

where $\overline{A}_{wf} = \begin{bmatrix} \overline{A}_{wof} & 0 \\ 0 & I \end{bmatrix}, \overline{B}_{wf} = \begin{bmatrix} \overline{B}_{wof} \\ 0_{3\times 1} \end{bmatrix},$ $\overline{C}_{wf} = [\overline{C}_{wof}\ \overline{F}], \overline{F} = \begin{bmatrix} F \\ 0 \end{bmatrix}, \overline{\omega}_{wf} = \begin{bmatrix} \overline{\omega}_{wof}(k) \\ \omega_f(k) \end{bmatrix},$ and wf indicates a fault.

In the example, the conditional probability of the fault-free model filter and the fault model filter is as follows:

$$p'_i(k)=Pr[a=a_i|Y(k)=Y_k], i=1,2$$

where $p'_1$ is the conditional probability of the fault-free model filter, and $p'_2$ is the conditional probability of the fault model filter; and therefore a conditional probability iterative update formula of the two filters is as follows:

$$p'_i(k) = \frac{f_{y(k)|a,Y_{k-1}}(y(k) \mid a_i, Y_{k-1})p'_i(k-1)}{\sum_{j=1}^{2} f_{y(k)|a,Y_{k-1}}(y(k) \mid a_i, Y_{k-1})p'_i(k-1)},$$

$$i = 1, 2 \text{ where } Y_{k-1} = \{y(1), y(2), \cdots, y(k-1)\}$$

is historical sensor measurement data, and a probability density function of the model in step k is as follows:

$$f_{y(k)|a,Y_{k-1}}(y(k) \mid a_i, Y_{k-1}) = \frac{\exp\{-\gamma_i^T(k)M_i^{-1}(k)\gamma_i(k)/2\}}{(2\pi)^{m/2}|M_i(k)|^{1/2}}$$

where m is the number of measurement outputs, |·| indicates a determinant of the matrix, $M_i(k)$ indicates an innovation covariance matrix of step k, and $\gamma_i(k)$ indicates innovation of step k.

Thus, weighted state estimation values computed by the probabilities of the two filters can be obtained:

$$\hat{x}(k) = \sum_{i=1}^{2} \hat{x}_i(k)p'_i(k) = \hat{x}_{wof}(k)p'_{wof}(k) + \hat{x}_{wf}(k)p'_{wf}(k).$$

In the example, assuming that the unknown input d(k) and the fault f(k) in the model of the system are random walk processes, i.e.

$$d(k+1)=d(k)+\omega_d(k)$$

$$f(k+1)=f(k)+\omega_f(k)$$

where $\omega_d(k)$ are $\omega_f(k)$ process noise variables having variances of $E\{\omega_d(k)(\omega_d(l))^T\}=Q_d(k)\delta_{kl}$ and $E\{\omega_f(k)(\omega_f(l))^T\}=Q_f(k)\delta_{kl}$ respectively, $Q_d(k)$ and $Q_f(k)$ are process noise covariance matrices of the unknown input d(k) and the fault f(k), the unknown input d(k) includes load torque $T_L$ and a rotating speed $\omega_h$ of a drill collar, and the fault f(k) includes the current measurement fault $f_{i_q}$, the gyroscope measurement fault $f_{\omega_g}$ and the tool face angle measurement fault $f_{\varphi}$. $Q_d(k)$ is computed by using an adaptive method, which is specifically as follows:

$$\overline{\omega}_{wof}(k) = \begin{bmatrix} \omega(k) + \omega^d(k) \\ \omega_d(k) \end{bmatrix} = \begin{bmatrix} \omega(k) + D_d\omega_d(k) \\ \omega_d(k) \end{bmatrix}$$

$\omega^d(k)$ is configured to compensate for an influence of a non-optimal value $Q_d(k)$ on state estimation, and the influence of the non-optimal value is approximated by using $D_d\omega_d(k)$;

a theoretical innovation covariance is as follows:

$$\check{M}_{wf}=C_1QC_1^T+(C_1D_d+C_2)Q_d(C_2D_d+C_2)^T+\overline{F}Q_f\overline{F}^T+R$$

an actual innovation covariance is as follows:

$$\hat{M}_{wf} = \frac{1}{N}\sum_{j=k-N+1}^{k} \gamma_{wf}(j)\gamma_{wf}^T(j)$$

$$\check{M} = \hat{M}$$

$$Q_d(k) = (C_1D_d+C_2)^{-1}(\hat{M}_{wf} - C_1QC_1^T - \overline{F}Q_f\overline{F}^T - R)((C_1D_d+C_2)^T)^{-1}$$

where noise matrices Q and R are constants, N is a sliding time window, and $Q_f$ is 0 since the system estimates a constant deviation fault.

In an iterative computation process, the conditional probability $p'_i(k)$ always remains zero as long as the conditional probability is computed to be zero at one time. Therefore, in order to avoid such a condition, a lower bound of the conditional probability $p'_i(k)$ is limited as 0.001, and an upper bound of the conditional probability is limited as 0.999.

In the example, a specific method of S4 includes: reinitialize the fault model filter by using a state estimation value is $\hat{x}_{wof}$ of the fault-free model filter and a state error covariance matrix $P_{wof}$ of the fault-free model filter under the condition that a detection result in S302a is fault-free; reinitialize the fault-free model filter by using a state estimation value $\hat{x}_{wf}$ of the fault model filter and a state error covariance matrix $P_{wf}$ of the fault model filter under the condition that the detection result in S302a is faulty; and estimate, by the fault model filter, the fault in real time, and obtain, by the fault model filter, the state estimation value $\hat{x}_{wf}$ of the fault model filter.

The two filters may be Kalman filters, state initial values $\hat{x}_{wof}$ and $\hat{x}_{wf}$ of the two filters need to be initialized. The state error covariance matrix $P_{wof}$ of the fault-free model filter and the state error covariance matrix $P_{wf}$ of the fault model filter are initialized. Moreover, in order to solve the problem of unequal state dimensions when the two filters are initialized with each other, $x_0^f$ and $P_0^f$ need to be initialized to ensure that state dimensions are consistent.

A first Kalman filter is designed on the basis of a fault-free model, a second Kalman filter is designed on the basis of a fault model, and the first Kalman filter and the second Kalman filter achieve parallel state estimation for the measurement and control device for the rotary steerable drilling system. The first Kalman filter estimates the state estimation value $\hat{x}_{wof}$ of the fault-free model filter, and computes the conditional probability $p'_{wof}$ of the fault-free model filter and the state error covariance matrix $P_{wof}$ of the fault-free model filter; and the second Kalman filter estimates the state estimation value $\hat{x}_{wof}$ $\hat{x}_{wf}$ of the fault model filter, and computes the conditional probability $p'_{wf}$ of the fault model filter and the state error covariance matrix $P_{wf}$ of the fault model filter.

It is considered that the system actually has no fault under the condition of $p'_{wof} > p'_{wf}$. The fault model filter is reinitialized by using the state estimation value $\hat{x}_{wof}$ and the state error covariance matrix $P_{wof}$ of the fault-free model filter, and since the state dimension of the fault-free model filter is less than that of the fault model filter, dimension data added by the fault filter model relative to the fault-free filter model uses the initial value of the state quantity in S2. The initial value is manually set, i.e.

$$\hat{x}_{wf,j}=x_f^0, j=n+1, \ldots, n+3$$

$$P_{wf,jj}=P_f^0, j=n+1, \ldots, n+3$$

where n=6, and $\hat{x}_{wf,j}$ indicates a j-th element of $\hat{x}_{wf}$, and $P_{wf,jj}$ indicates an element of a j-th row and a j-th column of the matrix $P_{wf}$.

It is considered that the system actually has a fault under the condition of $p'_{wof} \leq p'_{wf}$. The fault-free model filter is reinitialized by using the state estimation value $\hat{x}_{wf}$ and the state error covariance matrix $P_{wf}$ of the fault model filter.

According to the principle of a linear Kalman filter, at the moment k, the filter may compute an innovation $\gamma_i(k)$. A filter that more closely matches the actual system has a relatively small innovation. According to the conditional probability formula, the conditional probability computed may be higher, which indicates that the filter more closely matches the actual system, thereby determining whether the system has a fault.

Table 1 shows a specific process for selecting reinitialization.

TABLE 1

Specific process for selecting reinitialization
(start from the moment k)

1: Set a probability intermediate variable $p'_{temp,1} = p'_{wof}$ ; $p'_{temp,2} = p'_{wf}$ ;
2: Set a state intermediate variable $\hat{x}_{temp,1} = \hat{x}_{wof,j}{}^0$, $\hat{x}_{temp,2} = \hat{x}_{wf,j}{}^0$, j = 1,...,n ;
3: Set intermediate variables $P_{temp,1} = P_{wof,jj}{}^0$, $P_{temp,2} = P_{wf,jj}{}^0$, j = 1,...,n of a state estimation fault matrix;
4: Determine a filter label $i_{max,k} \in \{p'_{temp,i_{max,k}} = \max(p'_{temp,i}) | i = 1,2\}$ having a maximum model probability;
5: if $i_{max,k} = 1$ ;
6: Reinitialize a state initial value of a fault model filter at a moment k+1
$\hat{x}_{wf,j} = \hat{x}_{temp,i_{max,k}}$ , j = 1,...,n , and
$\hat{x}_{wf,j} = \hat{x}_f{}^0$ , j = n + 1,..., n + 3 ;
7: reinitialize an error covariance matrix of a fault model filter at a moment k+1
$P_{wf,jj} = P_{temp,i_{max,k}}$ , j = 1,..., n , and
$P_{wf,jj} = P_f{}^0$ , j = n + 1,..., n + 3 ;
8: end if;
9: if $i_{max,k} = 2$; ;
10: reinitialize a state initial value of a fault-free model filter at a moment k+1
$\hat{x}_{wof,j} = \hat{x}_{temp,i_{max,k}}$ , j = 1,..., n ;
11: reinitialize an error covariance matrix of a fault-free model filter at a moment k+1
$P_{wof,jj} = P_{temp,i_{max,k}}$ , j = 1,..., n ; and
12: end if..

In a table, $i_{max,k}$ is a model label that best match the actual system; $\hat{x}_{wof}{}^0 (\hat{x}_{wf}{}^0)$ and $\hat{x}_{wof}(\hat{x}_{wf})$ indicate posterior state estimation values of the fault-free model (faulty model) filter before and after reinitialization separately; and $P_{wof}{}^0 (P_{wf}{}^0)$ and $P_{wof}(P_{wf})$ indicate posteriori state estimation error covariance matrices of the fault-free model filter before and after reinitialization separately.

Figure 3:
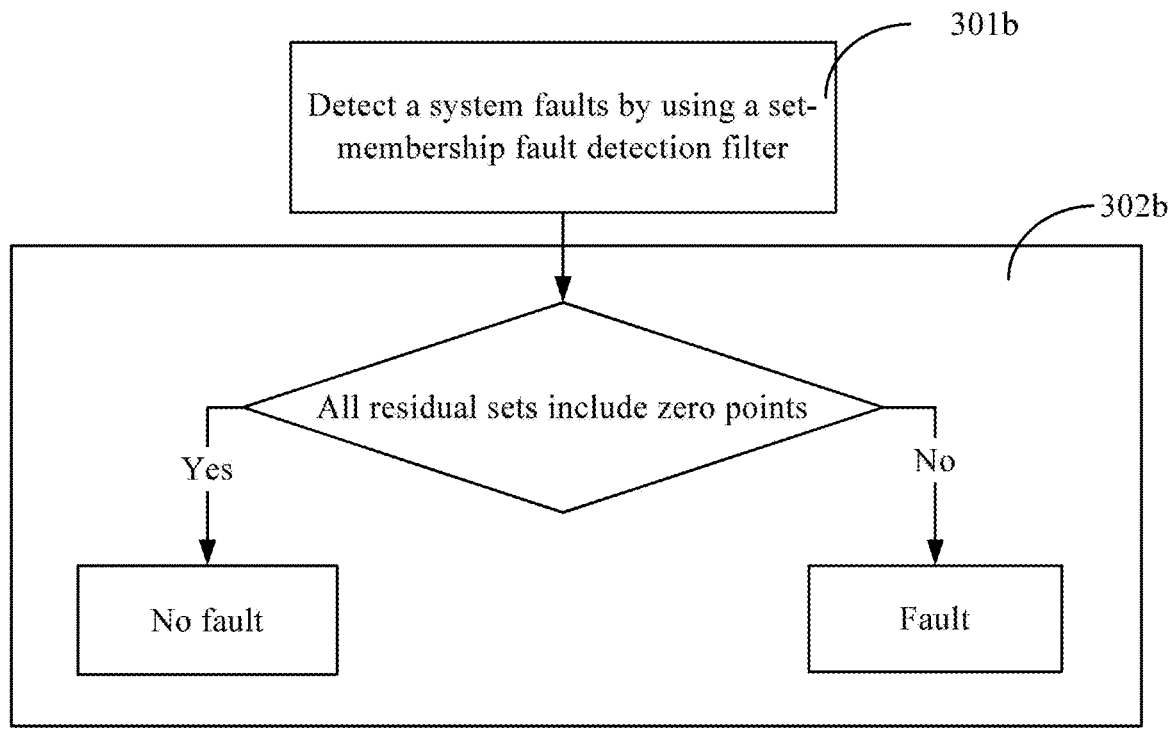
FIG. 3 is a flow chart of another method for fault estimation of a measurement and control device for a rotary steerable drilling system according to the present disclosure.

FIG. 3 is a flow chart of a method for detecting a fault of S3 in another example. Under the condition that the probability distribution of the noise of the system is unknown but bounded, the method for detecting a fault includes:

S301b, detect the fault of the system by using the following set-membership fault detection filter:

$p_r(k+1) = CRp_e(k) - C(L_1F + NF)f(k) + Ff(k+1) - CNF\Delta f(k+1)$ $H_r(k+1) = [CR\downarrow H_e(k)C(L_1F+NF)v(k)CNH_{\Delta v}H_vC(L_1F+NF)q(k)CNH_{\Delta q}H_q]$ where e and r indicate an error and a residual respectively; p and H indicate a center and a generation matrix of a set respectively; R and N are filter matrices to be designed separately; filter matrix parameters are accurately computed by minimizing $H_\infty$, $H_-/H_\infty$ and P-radius; and S302b, determine that the system has no fault under the condition that all residual sets include zero points, and determine that the system has a fault under the condition that any residual set does not include a zero point:

$$\begin{cases} 0 \in [\underline{s_i}(k)\ \overline{s_i}(k)] & \forall i \in \{1,2,3,4\} \text{ No Fault,} \\ 0 \notin [\underline{s_i}(k)\ \overline{s_i}(k)] & \exists i \in \{1,2,3,4\} \text{ Fault,} \end{cases}$$

where $\underline{s_i}(k) = p_{r,i}(k) - \|H_{r,i}(k)\|_1$, $\overline{s_i}(k) = p_{r,i}(k) + \|H_{r,i}(k)\|_1$, $p_{r,i}(k)$ and $H_{r,i}(k)$ indicate an i-th element of a center vector of a residual and an i-th row of the residual generation matrix at the moment k respectively; and $\underline{s_i}$ and $\overline{s_i}$ indicate a lower boundary and an upper boundary of the set respectively.

After determination of the fault of the system is completed, S4 is executed: reinitialize the fault model filter by using a state estimation value $\hat{x}_{wof}$ of the fault-free model filter and a state error covariance matrix $P_{wof}$ of the fault-free model filter under the condition that a detection result in S302b is fault-free; reinitialize the fault-free model filter by using a state estimation value $\hat{x}_{wf}$ of the fault model filter and a state error covariance matrix $P_{wf}$ of the fault model filter under the condition that the detection result in S302b is faulty; and estimate, by the fault model filter, the fault in real time, and obtain, by the fault model filter, the state estimation value of the fault model filter. The state estimation value $\hat{x}_{wf}$ of the fault model filter is the state estimation value of the fault of the measurement and control device.

Specific construction methods for the fault-free model filter and the fault model filter may be the construction method in the examples above, which will not be described herein in order to avoid repetition.

Figure 4:
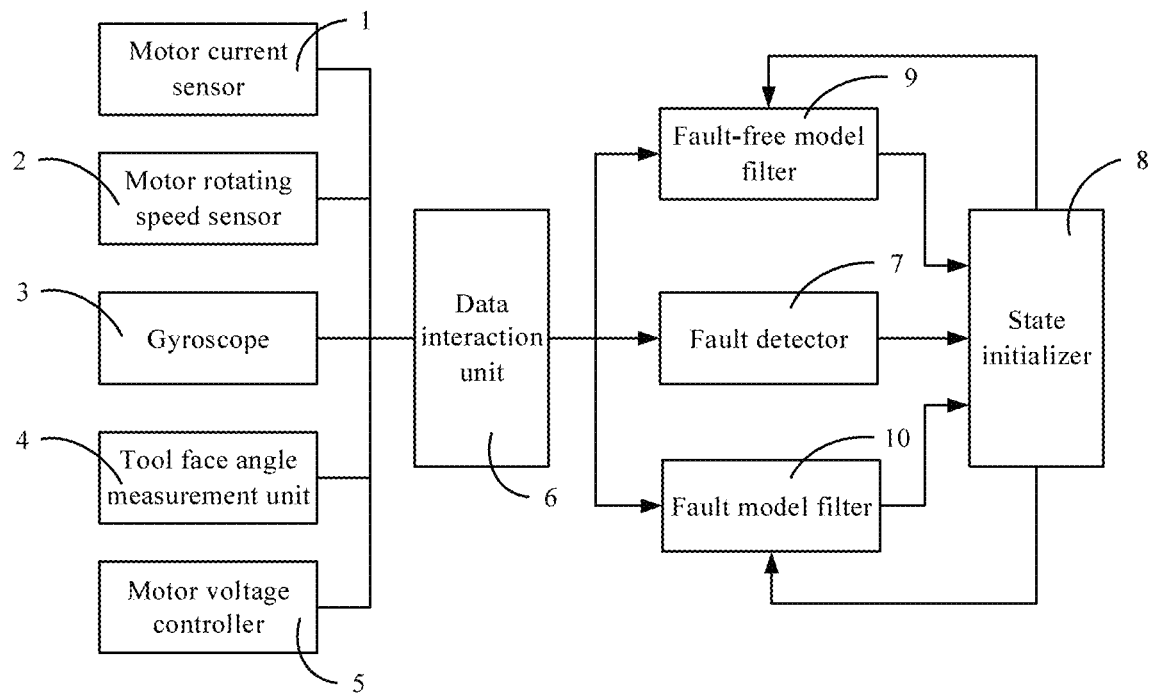
FIG. 4 is a schematic module diagram of a device for fault estimation of a measurement and control device for a rotary steerable drilling system according to the present disclosure.
Figure 5A:
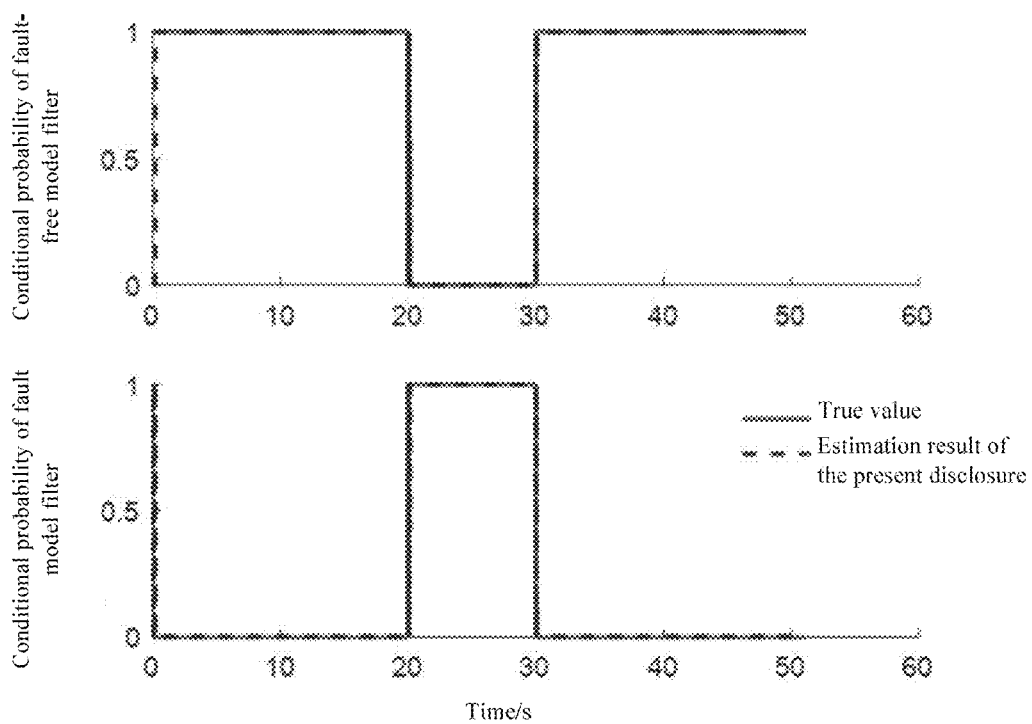
FIG. 5A shows a probability curve under the condition of a constant unknown input current measurement fault.
Figure 5B:
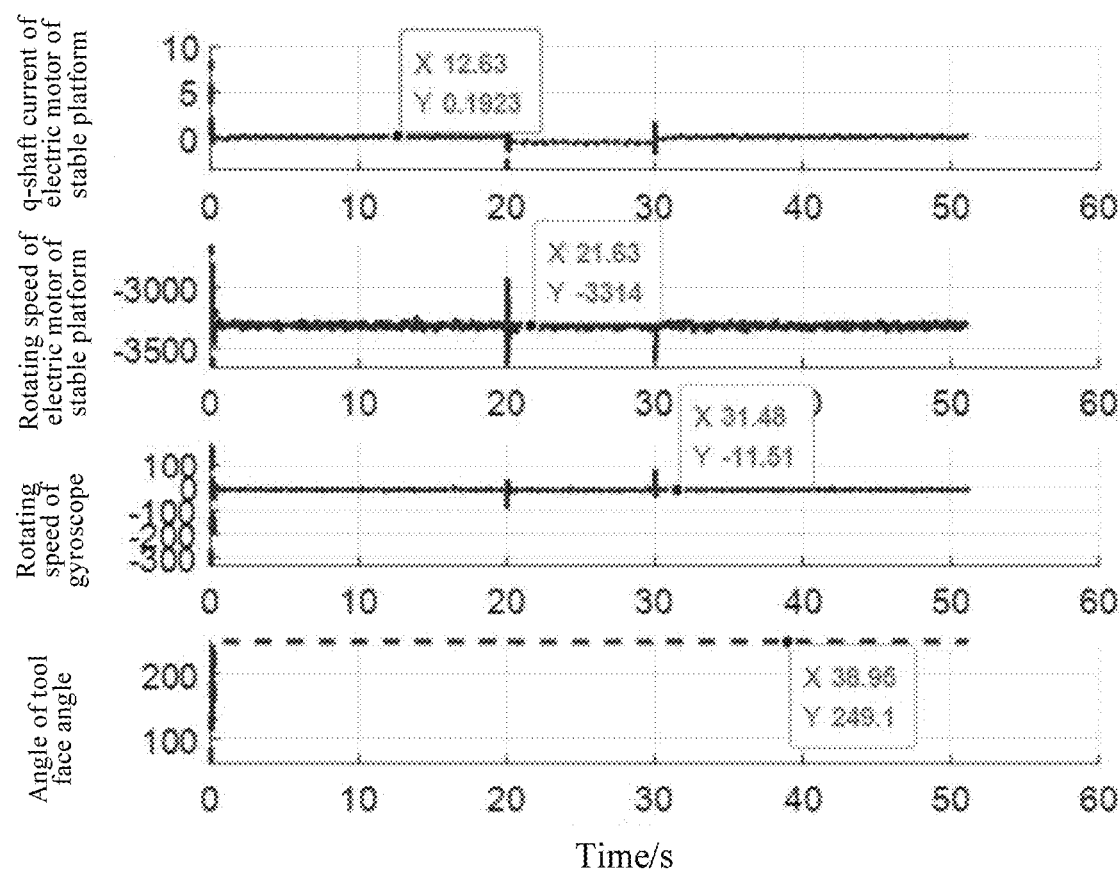
FIG. 5B shows a state curve under the condition of a constant unknown input current measurement fault.
Figure 5C:
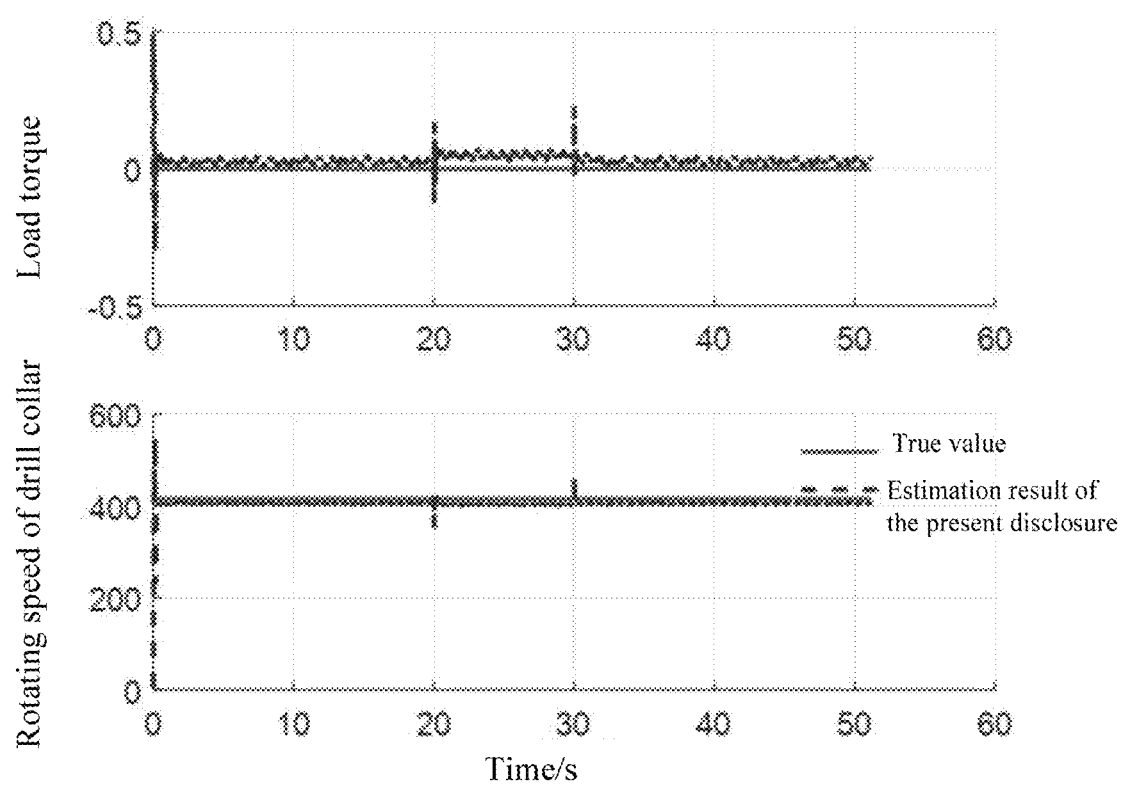
FIG. 5C shows an unknown input curve under the condition of a constant unknown input current measurement fault.
Figure 5D:
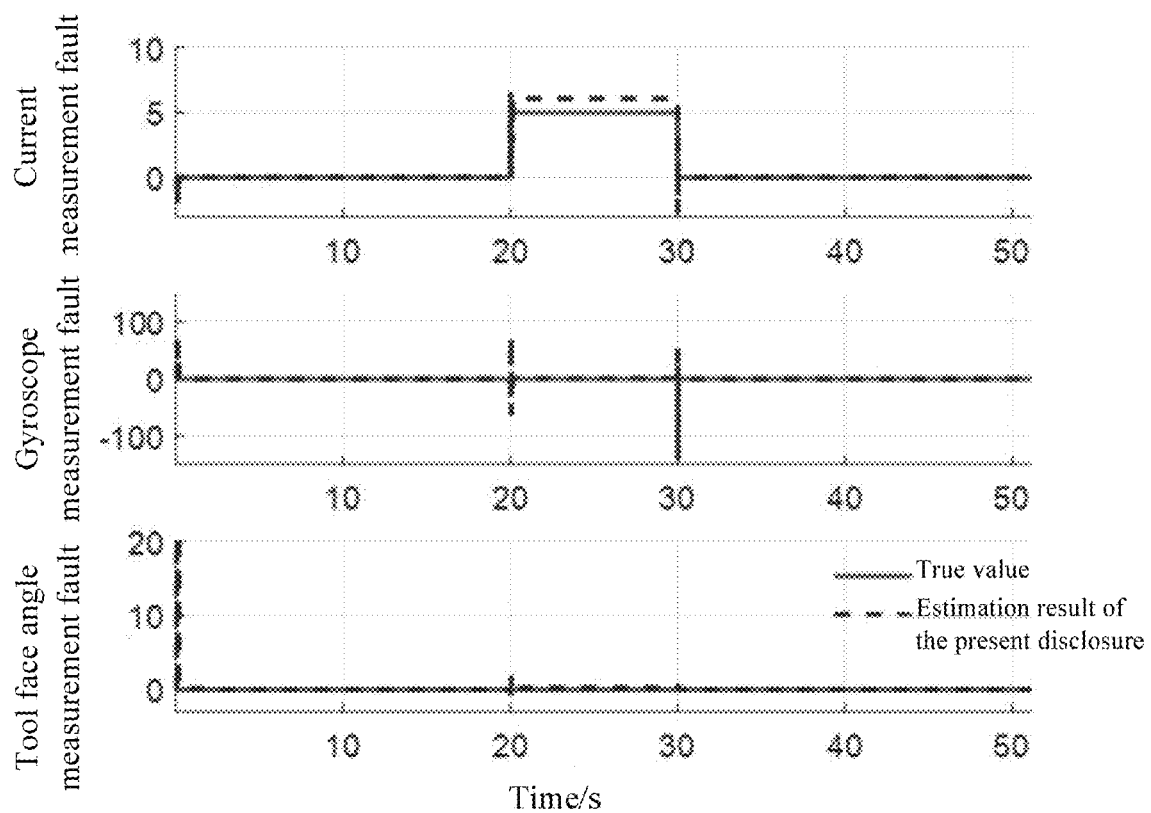
FIG. 5D shows a fault parameter curve under the condition of a constant unknown input current measurement fault.

In another example, a device for fault estimation of a measurement and control device for a rotary steerable drilling system is further provided. As shown in FIG. 4, the device is applied to implement the method for fault estimation of a measurement and control device for a rotary steerable drilling system. The measurement and control device for the rotary steerable drilling system includes a motor current sensor 1, a motor rotating speed sensor 2, a gyroscope 3, a tool face angle measurement unit 4, and a motor voltage controller 5; and the device for fault estimation includes a data interaction unit 6, a fault detector 7, a state initializer 8, a fault-free model filter 9, and a fault model filter 10.

The data interaction unit 6 is configured to obtain sensor data and motor voltage controller data, is connected to the fault detector 7, the fault-free model filter 9 and the fault model filter 10, and transmits obtained data to the fault detector 7, the fault-free model filter 9 and the fault model filter 10 for processing.

The fault-free model filter 9 computes a state estimation value $\hat{x}_{wof}$ of the fault-free model filter and a state error covariance matrix $P_{wof}$ of the fault-free model filter; and the fault model filter 10 computes a state estimation value $\hat{x}_{wf}$ of the fault model filter and a state error covariance matrix $P_{wf}$ of the fault model filter.

The fault detector 7 is connected to the state initializer 8, selects a method for detecting a fault according to noise characteristics, determines a fault condition of the system according to the data obtained by the data interaction unit 6, and sends the fault condition to the state initializer 8.

The state initializer 8 is connected to the fault-free model filter 9 and the fault model filter 10, and initializes the fault-free model filter 9 and the fault model filter 10 according to a fault result.

The device for fault estimation according to the example of the present disclosure can implement each process in the example corresponding to the method for fault estimation in the example above, which will not be described herein in order to avoid repetition.

It should be noted that the device for fault estimation according to the example of the present disclosure and the method for fault estimation according to the example of the present disclosure are based on the same inventive concept, and therefore the specific implementation of the example can refer to the implementation of the method for fault estimation of a measurement and control device for a rotary steerable drilling system, and the repetitions are not described.

The fault types of the measurement and control device for the rotary steerable drilling system include a current fault, a gyroscope fault and a tool face angle fault, and the processing effect of the present disclosure is described by taking the current fault as an example.

As shown in FIGS. 5A to 5D, in a state of a current fault, and under the condition that a probability distribution of noise of a system is known, a fault is detected by using S301a-S302a. The current fault occurs at 20 s-30 s, the current fault can be accurately estimated, and an original state estimation value can be computed, and conditional probability estimation values of a fault-free model filter and a fault model filter, a system original state estimation value, an unknown input estimation value, and an estimation value of the fault are all consistent with true values. It is indicated that the estimation method of the present disclosure can accurately estimate a sensor fault value of a measurement and control device for a rotary steerable drilling system.

Figure 6:
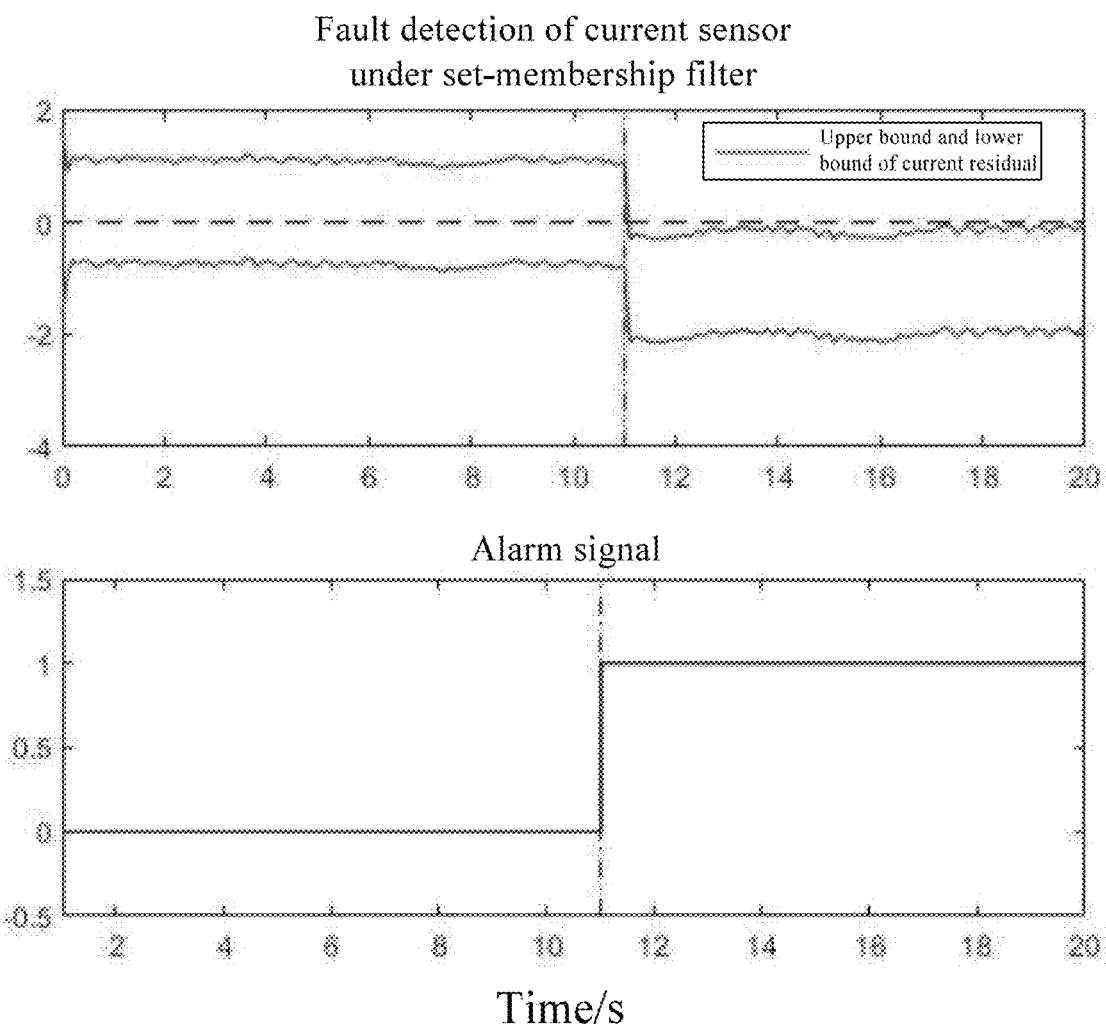
FIG. 6 shows a fault detection result under the condition of a current measurement fault.

In another test, a current fault is set, $$f_{i_q} = \begin{cases} 0A & t < 11s \\ 2.5115A & t \geq 11s \end{cases},$$

and the fault is detected by using the method for detecting a fault summarized in S301b-S302b:

fault detection results are shown in FIG. 6. It may be seen from the figure that at 0 s-11 s, a membership curve include a zero point, which indicates that a system has no fault; and after 11 s, the membership curve does not include a zero point, which indicates that the system has a fault, and is consistent with a fault setting value.

Table 2 shows a root-mean-square error (RMSE) of unknown input estimation under different quantization errors under the conditions of a current fault, a gyroscope fault and a tool face angle fault. A root-mean-square error of 16 bits is the smallest, and root-mean-square errors of 10 bits, 14 bits and 16 bits are sequentially reduced, but a difference is not large.

TABLE 2

| RMSE | Tool face angle fault | | | |
|---|---|---|---|---|
|  | 8 bit | 10 bit | 14 bit | 16 bit |
| Current fault $f_{i_q}$ | 0.3128 | 0.4584 | 0.4112 | 0.4110 |
| Gyroscope fault $f_{\omega_g}$ | 79.8773 | 10.0741 | 9.7683 | 9.7156 |
| Tool face angle fault $f_\varphi$ | 23.3917 | 0.6269 | 0.5752 | 0.5748 |

Figure 7:
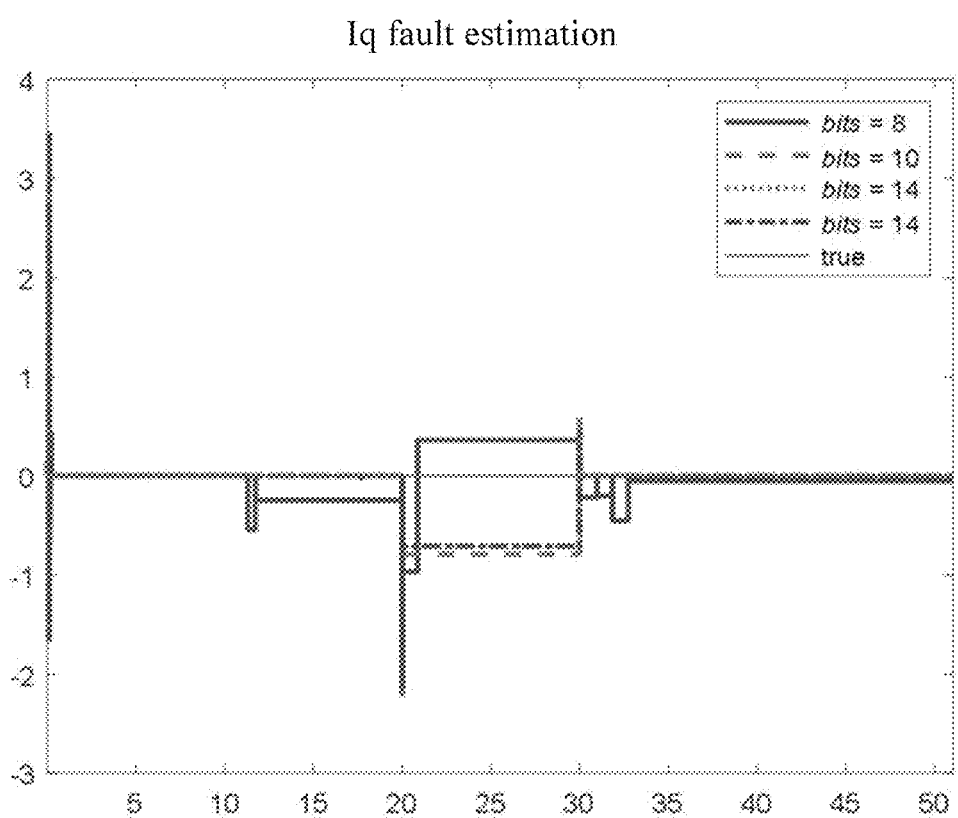
FIG. 7 is a comparison diagram of an estimation effect of a current sensor fault obtained by computing different bandwidths of sensor data through a filter.

FIG. 7 is a comparison diagram of an estimation effect of a current sensor fault obtained by computing different bandwidths of sensor data through a filter. It may be seen from the figure that a computation result of 8-bit bandwidth data excessively deviates from true values, and data loss is excessive. Even if the device may recover an original signal from noise, there are certain requirements for precision of sensor data. It may be seen from the figure that 10-bit, 14-bit and 16-bit bandwidth data may restore a trend of a real fault. Therefore, under the condition of a limited downhole data transmission bandwidth, the precision can be relaxed appropriately.

Finally, it should be noted that the above examples merely serve to describe the technical solutions of the present disclosure, rather than limiting the present disclosure. Although the present disclosure is described in detail with reference to the above examples, those of ordinary skill in the art should understand that the technical solutions described in the above examples may still be modified, or some of the technical features in the technical solutions may be equivalently replaced. However, these modifications or replacements do not make the essence of the corresponding technical solutions deviate from the scope of the technical solution of each example of the present disclosure. In summary, what are described above are merely preferred examples of the present disclosure, and any equivalent changes and modifications made according to the scope of the application patent of the present disclosure should fall within the scope of the patent of the present disclosure.

The invention claimed is:

1. A device for fault estimation of a measurement and control device for a rotary steerable drilling system, which is applied to implement a method for fault estimation of the measurement and control device, wherein the measurement and control device for the rotary steerable drilling system comprises a stable platform, an electric motor connected to the stable platform, a sensor unit, a motor driving board connected to the electric motor, and a motor voltage controller, wherein the sensor unit comprises a motor rotating speed sensor mounted on the electric motor, a motor current sensor mounted on the motor driving board, a gyroscope mounted on the stable platform, and a tool face angle measurement unit; and the device for fault estimation comprises a data interaction unit, a fault detector, a fault-free model filter, a fault model filter and a state initializer, wherein the data interaction unit is configured to obtain sensor data and motor voltage controller data, is connected to the fault detector, the fault-free model filter and the fault model filter, and transmits obtained data to the fault detector, the fault-free model filter and the fault model filter for processing;

the fault-free model filter computes a state estimation value $\hat{x}_{wof}$ of the fault-free model filter and a state error covariance matrix $P_{wof}$ of the fault-free model filter; the fault model filter computes a state estimation value $\hat{x}_{wf}$ of the fault model filter and a state error covariance matrix $P_{wf}$ of the fault model filter;

the fault detector is connected to the state initializer, determines a fault condition of the rotary steerable drilling system according to the data obtained by the data interaction unit, and sends the fault condition to the state initializer; and the state initializer is connected to the fault-free model filter and the fault model filter, and initializes the fault-free model filter and the fault model filter according to a fault result;

wherein the method for fault estimation comprises:

S1, establishing a state model of the measurement and control device for the rotary steerable drilling system:

$$x = [i_q \ \omega_n \ \omega_g \ \varphi]^T$$

$$\begin{cases} x(k+1) = Ax(k) + Bu(k) + D_d d(k) + \omega(k) \\ y(k) = Cx(k) + Ff(k) + v(k) + q(k) \end{cases}$$

wherein x is an original state quantity of the measurement and control device for the rotary steerable drilling system, $i_q$ is a q-shaft current of the electric motor of the stable platform, $\omega_n$ is a rotating speed of a driving motor of the stable platform, $\omega_g$ is a rotating speed of a gyroscope, φ is an angle of a tool face angle, x(k) is a state estimation value at a moment k, x(k+1) is a state estimation value at a moment k+1, u(k) is an output control quantity of a controller, $d(k)=[d_1(k) \ d_2(k)]^T = [T_L(k) \ \omega_h(k)]^T$ is an unknown input quantity, $T_L(k)$ is load torque at a moment k, $\omega_h(k)$ is a rotating speed of a drill collar at the moment k, y(k) is a measurement output value of the measurement and control device at the moment k, $f(k)=[f_{i_q} \ f_{\omega_g} \ f_\varphi]^T$ is a sensor measurement fault, $f_{i_q}$ is a sensor measurement fault, $f_{\omega_g}$ is a gyroscope measurement fault, and $f_\varphi$ is a tool face angle measurement fault; and ω(k) is process noise at the moment k, v(k) is sensor measurement noise at the moment k, q(k) is a quantization error at the moment k, A, B and C are a system matrix, a control matrix and an output matrix respectively, and $D_d$ and F are distribution matrices of the unknown input quantity and the sensor measurement fault respectively;

S2, establishing the fault-free model filter and the fault model filter on the basis of the state model of the measurement and control device for the rotary steerable drilling system, and initializing the fault-free model filter and the fault model filter, wherein the fault-free model filter is formed by augmenting unknown inputs $d_1$ and $d_2$ as a state of the system on the basis of the state model of the measurement and control device for the rotary steerable drilling system, $d_1$ is load torque $T_L$, and $d_2$ is a rotating speed $\omega_h$ of a drill collar; a model state of the fault-free model filter is as follows:

$$x_{wof} = [i_q \ \omega_n \ \omega_g \ \varphi \ T_L \ \omega_h]^T$$

$$\begin{cases} \bar{x}_{wof}(k+1) = \bar{A}_{wof}\bar{x}_{wof}(k) + \bar{B}_{wof}u(k) + \bar{\omega}_{wof}(k) \\ \bar{y}(k) = \bar{C}_{wof}\bar{x}_{wof}(k) + \bar{v}(k) + \bar{q}(k) \end{cases}$$

wherein $\bar{A}_{wof} = \begin{bmatrix} A & D_d \\ 0 & I_2 \end{bmatrix}$, $\bar{B}_{wof} = \begin{bmatrix} B \\ 0_{2\times 1} \end{bmatrix}$, $\bar{C}_{wof} = [C_1 \ C_2]$, $$C_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 1 \\ 0 & \beta & -1 & 0 \end{bmatrix}, C_2 = \begin{bmatrix} 0 & 0 \\ 0 & 0 \\ 0 & 0 \\ 0 & 0 \\ 0 & 0 \\ 0 & 1 \end{bmatrix}, \bar{\omega}_{wof}(k) = \begin{bmatrix} \omega(k) \\ \omega_d(k) \end{bmatrix}, \bar{y}(k) = \begin{bmatrix} y(k) \\ y_5(k) \end{bmatrix},$$

$\bar{v}(k)$ is sensor measurement noise at the moment k after a pseudo-measurement sensor value $y_5(k)$ is added into the system, $\bar{q}(k)$ is a sensor quantization error at the moment k after the pseudo-measurement sensor value $y_5(k)$ is added into the system, and wof indicates no fault occurs;

the fault model filter is formed by adding the current measurement fault $f_{i_q}$, the gyroscope measurement fault $f_{\omega_g}$ and the tool face angle measurement fault $f_\varphi$ on the basis of the fault-free model filter; and a state of the fault model filter is as follows:

$$x_{wf} = [i_q \ \omega_n \ \omega_g \ \varphi \ T_L \ \omega_h \ f_{i_q} \ f_{\omega_g} \ f_\varphi]^T$$

$$\begin{cases} \bar{x}_{wf}(k+1) = \bar{A}_{wf}\bar{x}_{wf}(k) + \bar{B}_{wf}u(k) + \bar{\omega}_{wf}(k) \\ \bar{y}(k) = \bar{C}_{wf}\bar{x}_{wf}(k) + \bar{v}(k) + \bar{q}(k) \end{cases},$$

wherein $\bar{A}_{wf} = \begin{bmatrix} \bar{A}_{wof} & 0 \\ 0 & I \end{bmatrix}$, $\bar{B}_{wf} = \begin{bmatrix} \bar{B}_{wof} \\ 0_{3\times 1} \end{bmatrix}$, $$\bar{C}_{wf} = [\bar{C}_{wof} \ \bar{F}], \bar{F} = \begin{bmatrix} F \\ 0 \end{bmatrix}, \bar{\omega}_{wf}(k) = \begin{bmatrix} \bar{\omega}_{wof}(k) \\ \omega_f(k) \end{bmatrix},$$

and wf indicates that a fault occurs;

S3, selecting a method for detecting a fault according to noise characteristics to detect whether the measurement and control device for the rotary steerable drilling system has the fault;

and determining the method for detecting the fault in S3 as follows under the condition that a probability distribution of noise of the system is known: computing conditional probabilities $p'_{wof}$, $p'_{wf}$ of the fault-free model filter and the fault model filter respectively, and considering that the system has no fault under the condition of $p'_{wof} > p'_{wf}$; and considering that the system has a fault under the condition of $p'_{wof} \leq p'_{wf}$; and S4, reinitializing the fault model filter by using a state estimation value $\hat{x}_{wof}$ of the fault-free model filter and a state error covariance matrix $P_{wof}$ of the fault-free model filter under the condition that a detection result is fault-free; reinitializing the fault-free model filter by using a state estimation value $\hat{x}_{wf}$ of the fault model filter and a state error covariance matrix $P_{wf}$ of the fault model filter under the condition that the detection result is faulty; estimating, by the fault model filter, the fault in real time, and obtaining, by the fault model filter, the state estimation value $\hat{x}_{wf}$ of the fault model filter; and establishing a pseudo-measurement formula by constructing virtual measurement values having mean variances equal to 0 by using a constraint relation between the rotating speed $\omega_n$ of the driving motor of the stable platform, the rotating speed $\omega_g$ of the gyroscope and the rotating speed $\omega_h$ of the drill collar:

$y_5 = 0 = \beta\omega_n - \omega_g + \omega_h$, wherein $y_5$ is a set pseudo-measurement sensor value, and β is a constant.

\* \* \* \* \*